(12) United States Patent
Huyke-Phillips

(10) Patent No.: US 9,526,309 B2
(45) Date of Patent: Dec. 27, 2016

(54) MAGNETIZED LINER FOR STORAGE AND HOLDING BAGS

(71) Applicant: George-Michael Huyke-Phillips, Van Nuys, CA (US)

(72) Inventor: George-Michael Huyke-Phillips, Van Nuys, CA (US)

(*) Notice: Subject to any disclaimer, the term of this patent is extended or adjusted under 35 U.S.C. 154(b) by 0 days.

(21) Appl. No.: 14/265,213

(22) Filed: Apr. 29, 2014

(65) Prior Publication Data

US 2015/0305463 A1    Oct. 29, 2015

(51) Int. Cl.
| | |
|---|---|
| *A45C 13/10* | (2006.01) |
| *A45C 13/02* | (2006.01) |
| *A45C 11/16* | (2006.01) |
| *B29C 44/12* | (2006.01) |
| *D05B 23/00* | (2006.01) |

(52) U.S. Cl.
CPC .............. *A45C 13/02* (2013.01); *A45C 11/16* (2013.01); *A45C 13/1069* (2013.01); *B29C 44/12* (2013.01); *D05B 23/00* (2013.01); *A45C 2013/026* (2013.01)

(58) Field of Classification Search
CPC ..... A45C 13/69; A45C 13/1069; A45C 13/02; A45C 2013/1026; A45C 11/36; A45C 11/38; A45C 2013/026; F41C 33/06
USPC 150/103–105, 118, 125, 100, 127; 206/818, 317; 24/303; 248/209.4; 335/306
See application file for complete search history.

(56) References Cited

U.S. PATENT DOCUMENTS

| | | | | |
|---|---|---|---|---|
| 2,540,340 | A * | 2/1951 | Linblade | 43/57.1 |
| 2,784,757 | A * | 3/1957 | Bosca et al. | 150/138 |
| 3,483,494 | A * | 12/1969 | Cromie | 128/852 |
| 3,727,658 | A * | 4/1973 | Eldridge, Jr. | 206/370 |
| 4,303,184 | A * | 12/1981 | Kloth | 224/447 |
| 4,373,629 | A * | 2/1983 | Ulin et al. | 206/350 |
| 4,826,059 | A * | 5/1989 | Bosch et al. | 224/183 |
| 5,934,464 | A * | 8/1999 | Vargo et al. | 206/315.11 |
| 6,446,688 | B1 | 9/2002 | Sutton | |
| 7,721,470 | B2 | 5/2010 | Long | |
| 7,806,309 | B2 * | 10/2010 | Korchmar | 224/578 |
| 7,926,525 | B2 | 4/2011 | Vaccarella | |
| 8,251,113 | B2 | 8/2012 | Baxter | |
| 8,646,971 | B2 | 2/2014 | Doyle | |
| 2003/0201198 | A1 * | 10/2003 | Gantert | 206/317 |
| 2007/0163689 | A1 * | 7/2007 | Pace et al. | 150/105 |
| 2008/0230158 | A1 * | 9/2008 | Romero et al. | 150/105 |
| 2009/0301911 | A1 * | 12/2009 | Rubin | 206/315.11 |
| 2011/0000590 | A1 * | 1/2011 | Welch et al. | 150/104 |
| 2012/0216927 | A1 | 8/2012 | Marier | |
| 2013/0306206 | A1 * | 11/2013 | Quinnan | 150/105 |
| 2014/0026375 | A1 * | 1/2014 | Gibby | 24/303 |

FOREIGN PATENT DOCUMENTS

| | | | |
|---|---|---|---|
| EP | 2581326 A1 | * | 4/2013 |
| WO | WO 2007081830 A1 | * | 7/2007 |
| WO | WO 2012076946 A1 | * | 6/2012 |

* cited by examiner

*Primary Examiner* — Sue A Weaver
(74) *Attorney, Agent, or Firm* — Sanford Astor, Esq.; Brooks Kushman P.C.

(57) ABSTRACT

Disclosed is an liner comprising magnets which can be inserted in handbags and suitcases. Such an insert is useful for holding one or more metallic objects in place. Also, disclosed is a magnetic storage and holding bag useful for holding objects, such as metallic jewelry or firearms.

10 Claims, 14 Drawing Sheets

MAGNETIZED LINER FOR STORAGE AND HOLDING BAGS

CROSS REFERENCE TO RELATED APPLICATIONS

This application claims the benefit of U.S. Provisional Patent Application Ser. No. 61/817,142, filed Apr. 29, 2013, and U.S. Provisional Patent Ser. No. 61/923,224, filed Jan. 3, 2014.

BACKGROUND TO THE INVENTION

Bags used for storing and transporting materials have been used for centuries. Using bags provides a means of efficiency for such activities. For example, handbags are a popular means for storing and carrying a plethora of items including money, keys, mobile phone, books, pen and paper, cosmetics and jewelry. Conventional purse designs typically utilize a main cavity in order to hold such items. Variations in design can add various pockets to the inside or outside of the purse cavity. While these cavities and pockets typically hold items of interest without loss of articles, they are unfavorable for holding certain metallic items, such as a necklace or rings, due to movement of the objects during transport. For example, necklaces may become intertwined with itself or other objects. Thus, upon retrieval of the necklace, it may be challenging to extract the object from the purse, or purse pocket, without breaking it. Even more, such movement may cause other types of damage to the metallic contents, such as scratches.

The object of the present invention solves this challenge by providing a means for maintaining positioning of the item of interest.

SUMMARY OF THE INVENTION

The magnetic bag of the present invention, or MagBag, is used to safely and efficiently transport items of interest, such as jewelry, makeup, accessories and/or firearms. The magnetic bag of the present invention limits the movement of the contents through magnetism. A grid of magnets sown, or otherwise attached, into the walls of the bag constrict the contents and keep everything firmly in place during traveling and transport. The magnets will either react directly with the contents or indirectly with each other to keep all the contents restricted from movement after closure of the purse of pocket. Even with heavy movement and force during travel or transport, upon reopening the bag or pocket, the contents appear in the same location as they were prior to travel and transport. The Magbag keeps jewelry from tangling, makeup from breaking or spilling and keep firearms and accessories safe from scratching and damage.

BRIEF DESCRIPTION OF THE DRAWINGS

FIG. 9: A cross-section showing an outer shell and an inner shell with a grid of magnets between.

DETAILED DESCRIPTION OF THE INVENTION

The following detailed description is merely exemplary in nature and is not intended to limit the described embodiments of the invention and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations.

All of the implementations described below are exemplary implementations provided to enable persons skilled in the art to practice the invention and are not intended to limit the scope of the appended claims. Furthermore, there is no intention to be bound by any expressed or implied theory presented in the preceding technical field, background, brief summary or the following detailed description.

Described herein is an insert containing magnets arranged in certain patterns. The insert can be embedded into the lining of various carrying cases, including but not limited to, purses, pouches and suitcases. Also described are carrying cases having such an insert. In certain embodiments, the carrying cases have magnets embedded into them without such use of an insert.

The magnetic bag, or carrying cases, of the present invention comes in a variety of shapes and sizes from rectangles of all sizes, to circles of all sizes, to squares of sizes, to custom shapes and dimensions of all sizes. The bag can be used for various utility functions for jewelry, makeup, cables, writing tools (pens pencils and crayons), firearms, knives, silverware, sewing accessories and tools of all kinds.

The magnetic bag may be constructed of a variety of outer fabrics with a variety of styles and colors. The entire bag may be closed with either a zipper or clasp or strap or buttons or velcro or magnets or a combination thereof. In certain embodiments, the bag can vary in size. In other embodiments, the bag can vary in shape, such as a rectangle, square, circle, triangle, hexagon, or octagon.

In certain embodiments, the magnets can be secured to the bag by glue, sewing, tacking or by creating a fabric insert with pockets for the magnets.

Figure 2:
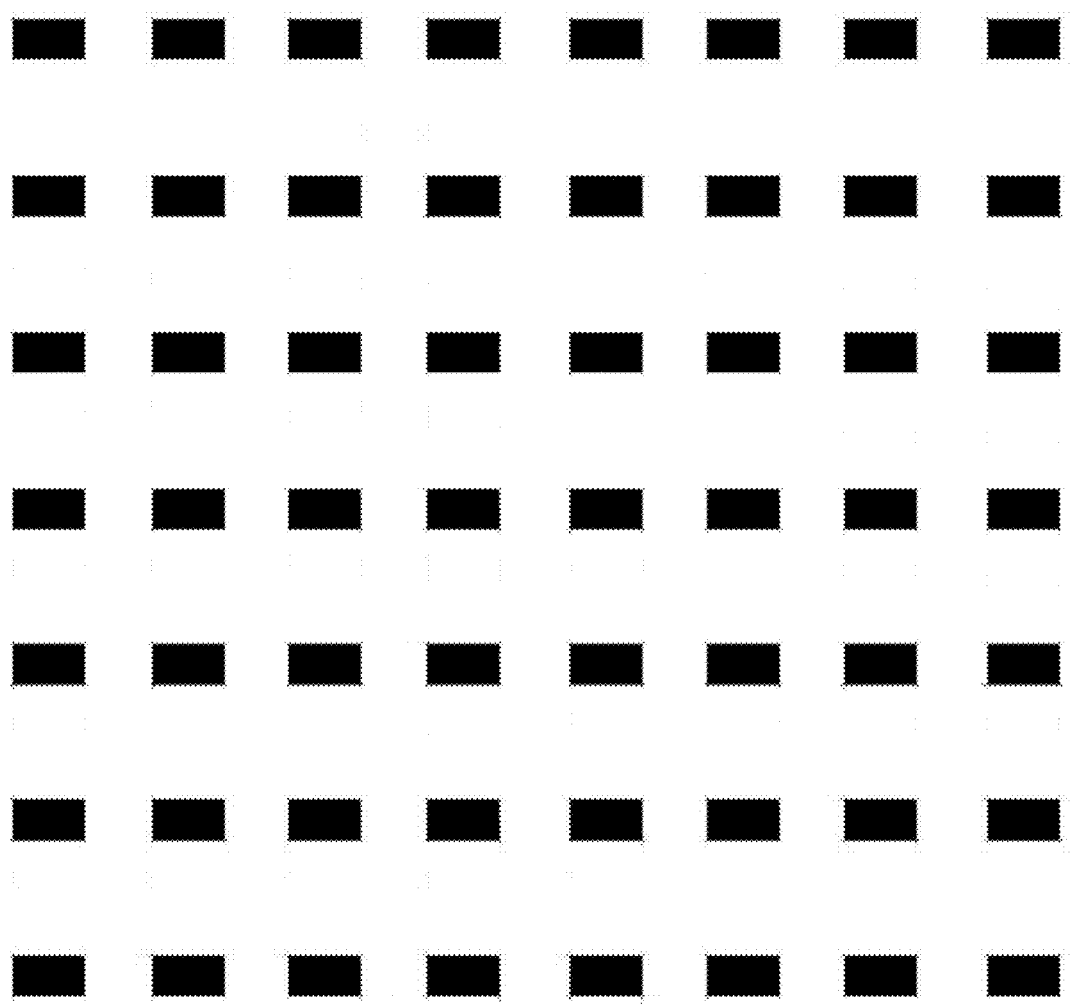
FIG. 2: An exemplified portrayal of patterning magnets within the invention. Here, magnets are shaped as rectangles and are evenly distributed along a two dimensional pattern.
Figure 3:
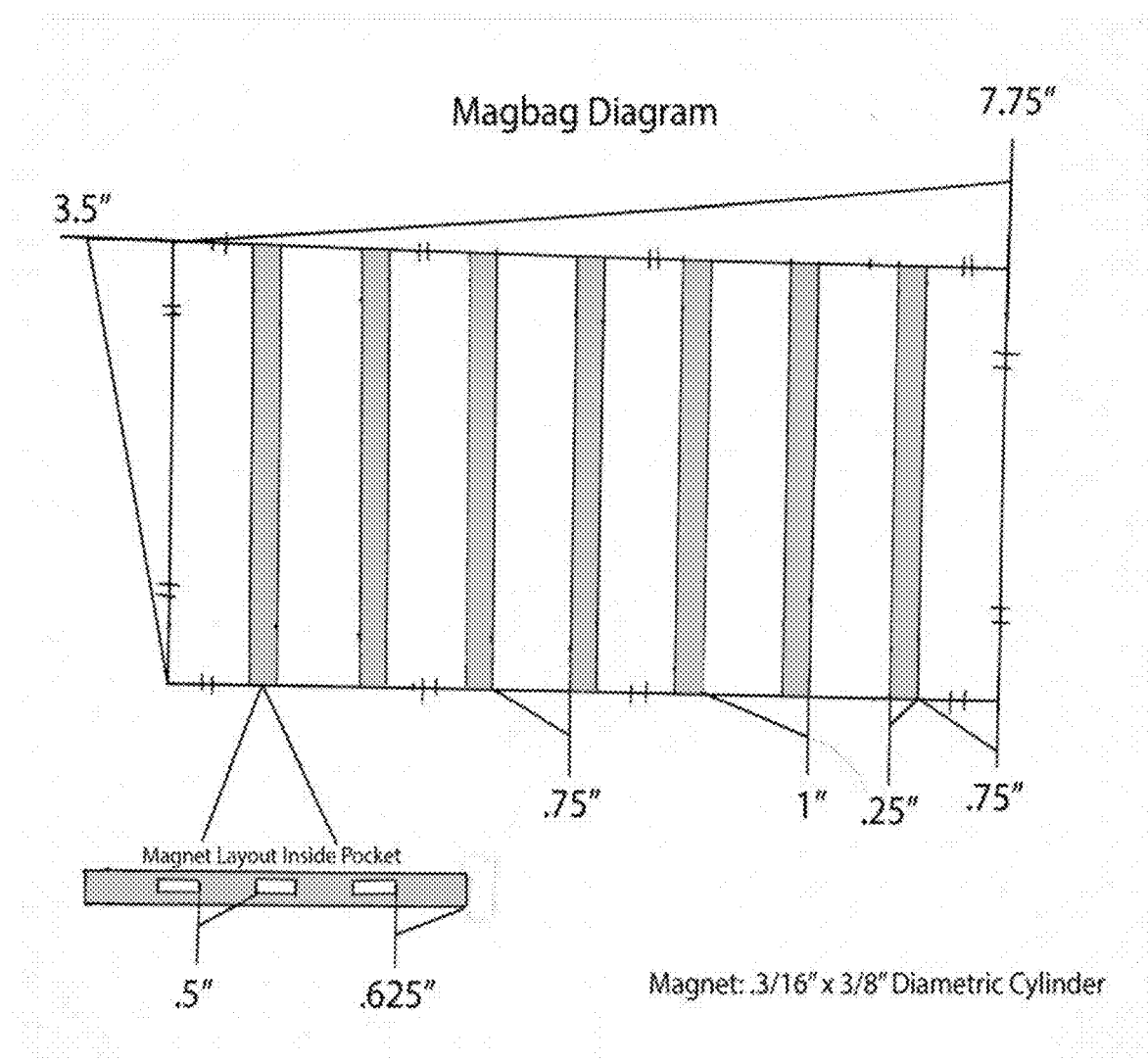
FIG. 3: An exemplified portrayal of patterning magnets within the invention. Here, magnets are shaped as rectangles and are evenly distributed along a two dimensional pattern. The magnets are about 0.25 inches wide and placed about 0.75 inches apart from each other. Also shown is an embodiment showing the inside view of magnet layout inside a pocket. A thin layer of fabric covers the magnets for final assembly.
Figure 4:
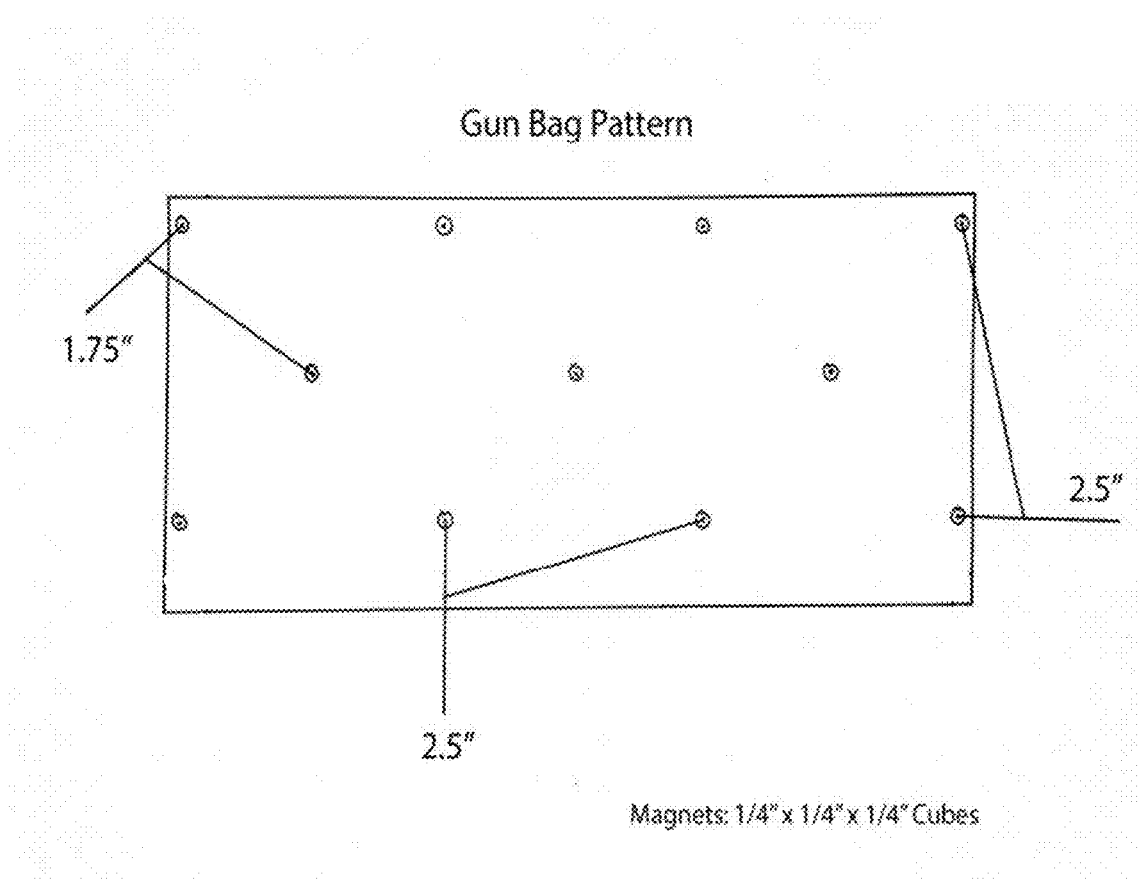
FIG. 4: An exemplified portrayal of patterning magnets within the invention. Here, circular magnets are shown which are about 2.5 inches longitudinally and laterally from each other while being placed about 1.75 inches apart diagonally.
Figure 5:
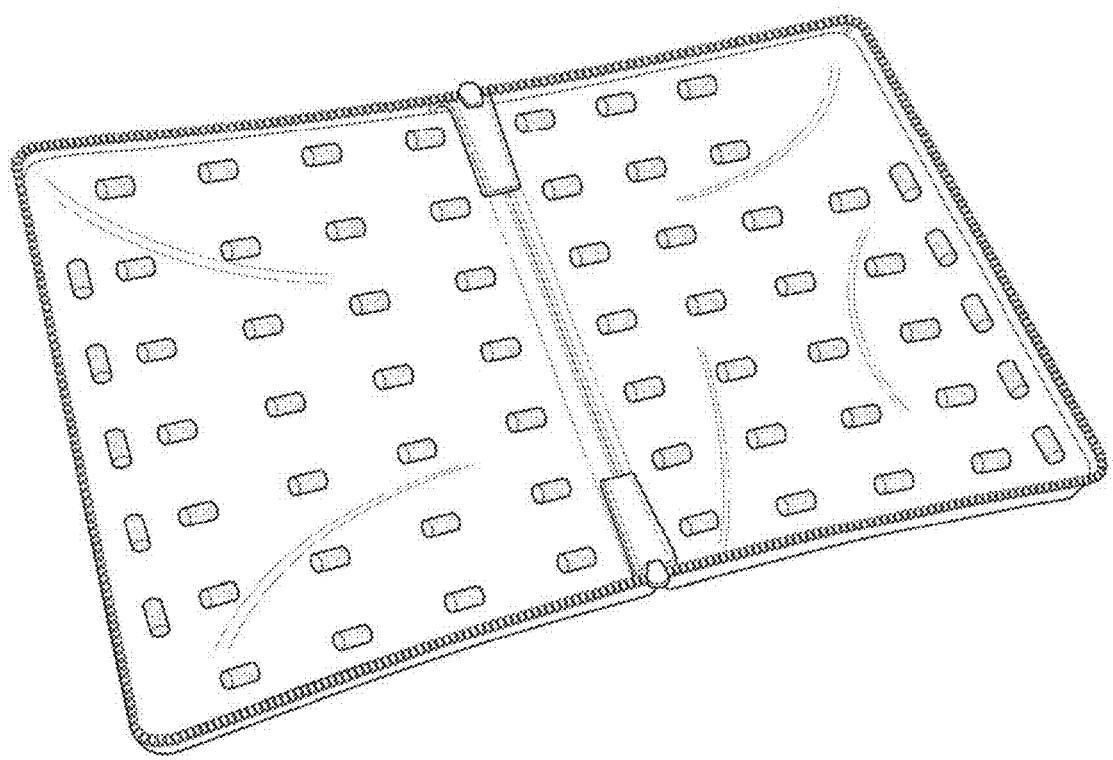
FIG. 5: An embodiment of the invention showing a top perspective of a zipped open pouch containing cylindrical magnets. The magnets are present on both sides of the pouch to ensure magnetization around a metallic object of interest.
Figure 6A:
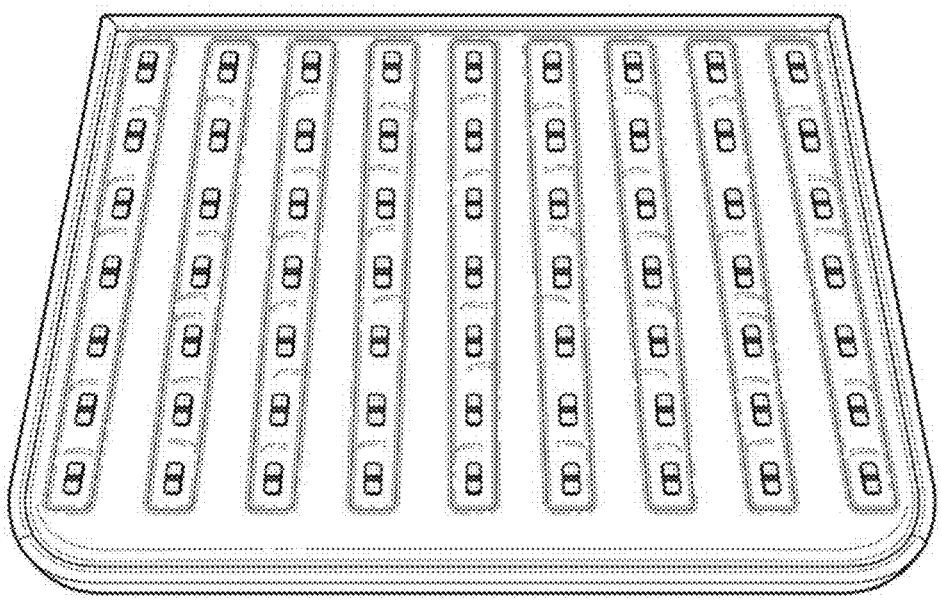
FIG. 6A: An embodiment of the invention showing a top perspective of a foam insert containing rectangular prism shaped magnets.
Figure 6B:
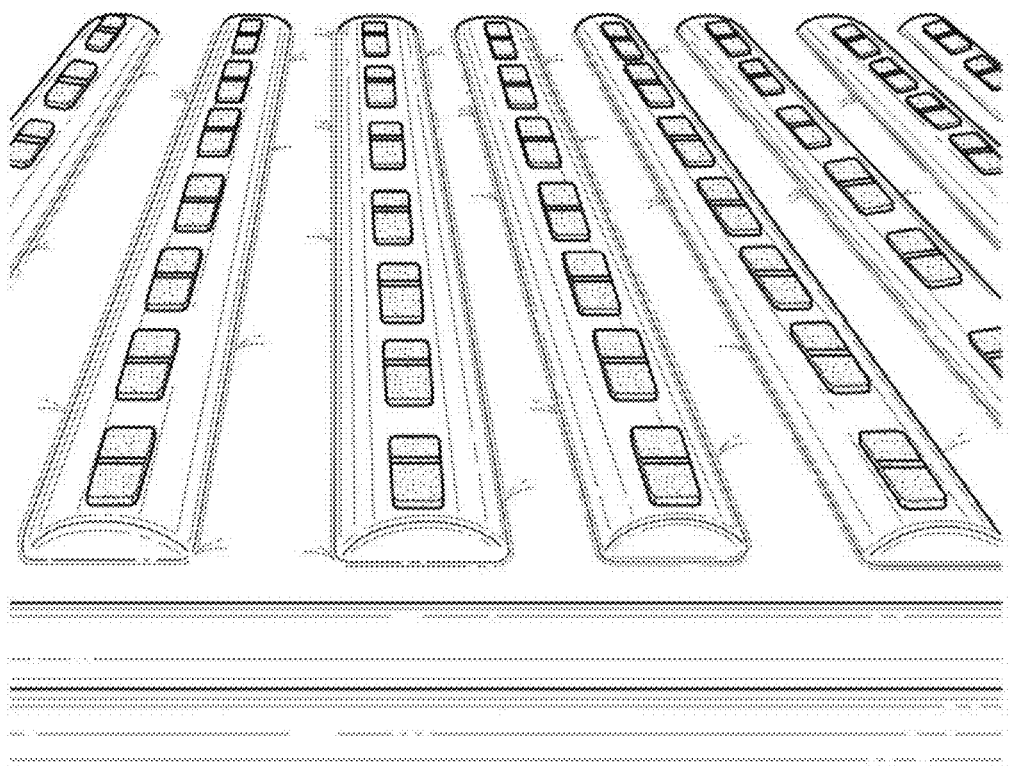
FIG. 6B: An embodiment of the invention showing a side perspective of a foam insert containing rectangular prism shaped magnets. In this embodiment, the magnets are placed on rounded ridges cut from the foam.
Figure 7A:
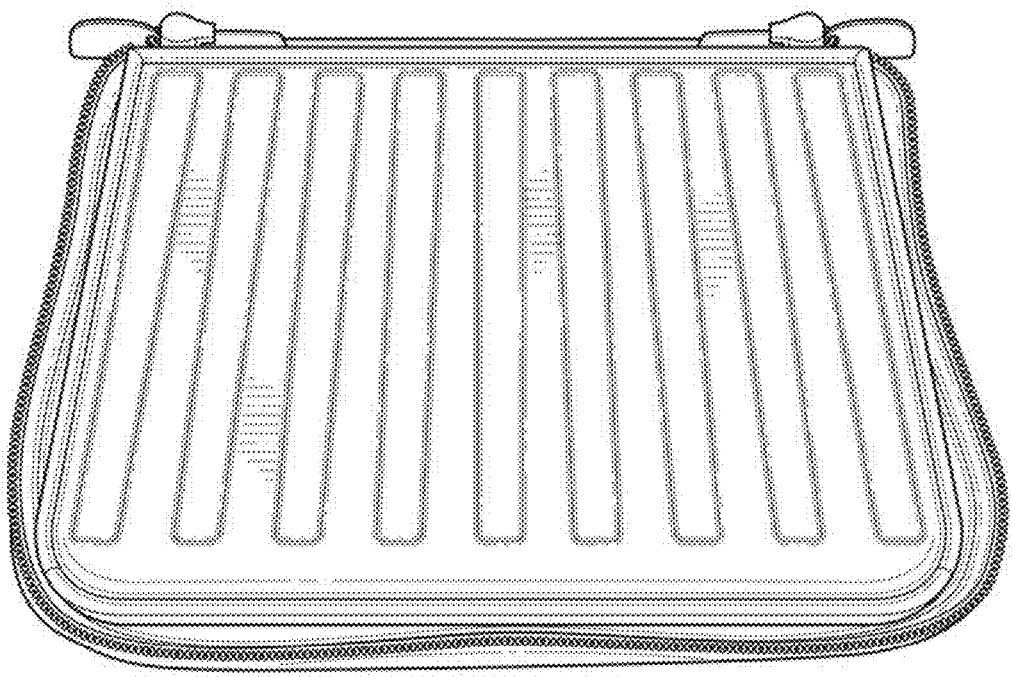
FIG. 7A: An embodiment of the invention showing a top perspective of a folded closed pouch containing inserts of the invention. Here, regions where the magnets are placed are represented by rectangular shapes.
Figure 7B:
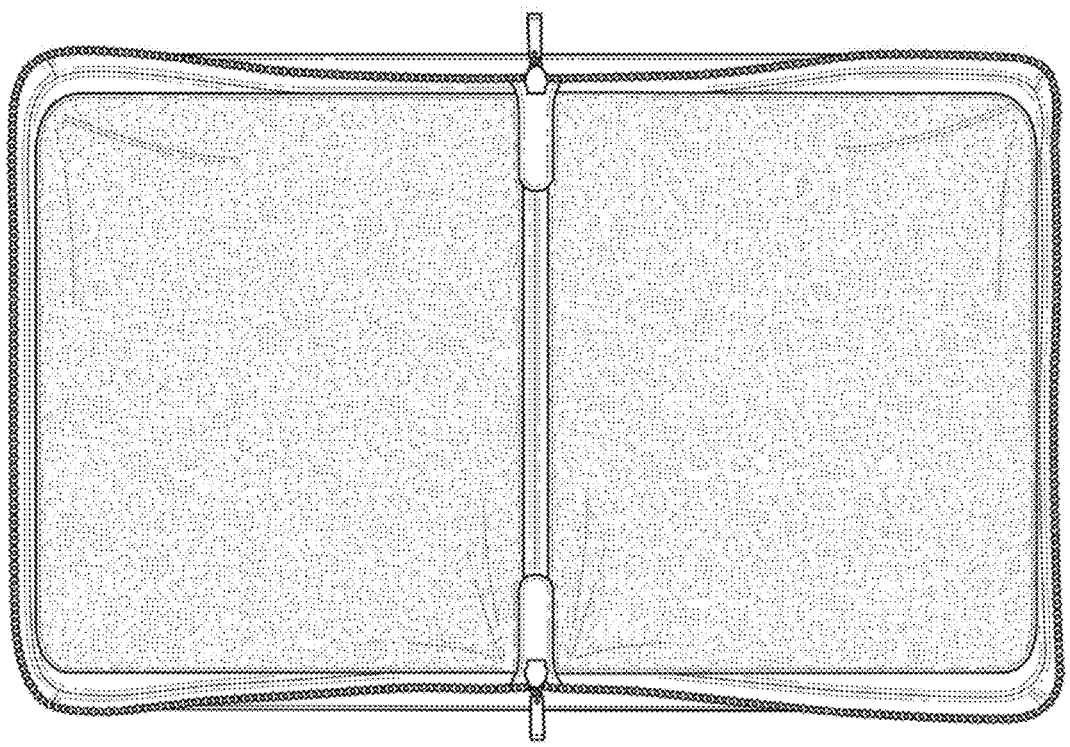
FIG. 7B: An embodiment of the invention showing a top perspective of an open pouch containing inserts of the invention. In this embodiment, the magnetic insert is not seen due to its presence being in between the pouches inner and outer materials.
Figure 8:
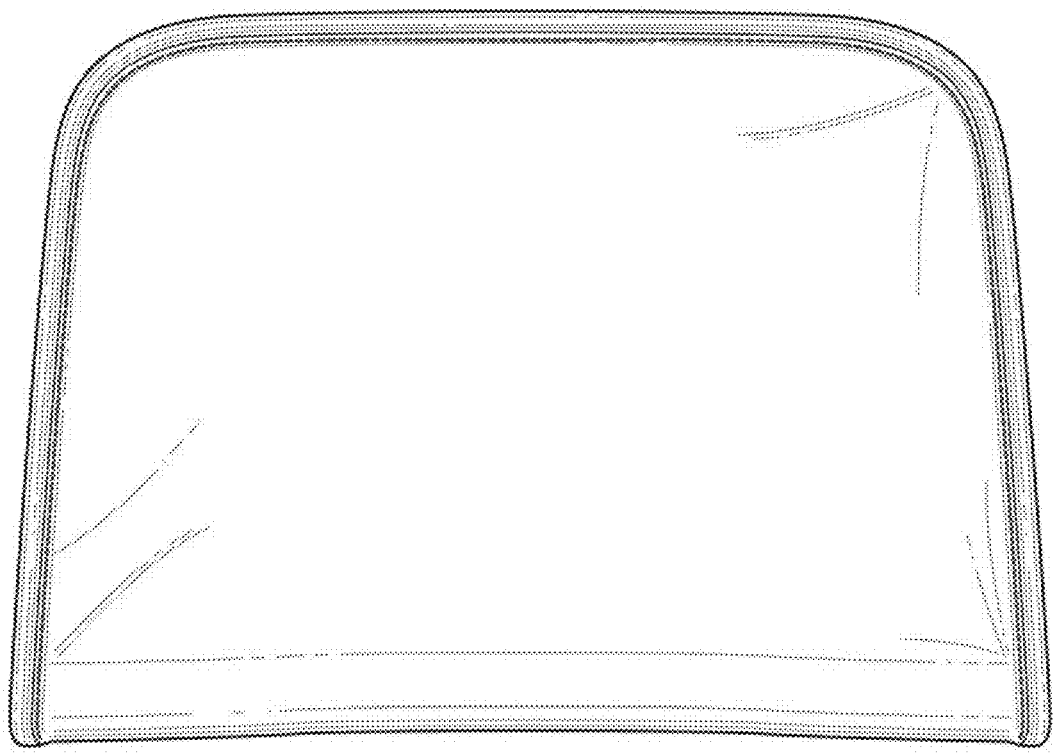
FIG. 8: An embodiment of the invention showing a side perspective of a folded closed pouch containing inserts of the invention. In this embodiment, the magnetic insert is not seen due to its presence being in between the pouches inner and outer materials.

In certain embodiments, the magnets can be embedded into a material, such as foam. In certain embodiments, the foam can be L200 or ethylene vinyl acetate (EVA). In certain embodiments, the magnets can be embedded into the foam according to a parallel pattern such as shown in FIG. 2. In certain embodiments, a layer of poly(vinyl chloride), or PVC, may be set on top of the magnet containing foam. In certain embodiments, PVC is sewn on one face of the magnet containing foam. In certain embodiments, PVC is sewn on both faces of the magnet containing foam.

Magnets may be cast, or embedded, into foam by first inserting the magnets in a grid like fashion into the foam inner liner mold before foam is injected and cured. Next, foam may be injected and cured. After foam is injected and cured, the finished product may comprise a sheet of foam with magnets impregnated in the foam without any type of sewing or gluing. In certain embodiments, sewing and gluing can be added after the foam has cured.

In certain embodiments, the bag may be manufactured using a 0.25 PVC sheet with the magnet layout printed on the PVC sheet then laser cut out. The PVC sheet may then be used to hold the magnets in place while they are secured to the bag. After magnets are installed, a thin layer of fabric may be sown over the magnet grid to provide a soft layer between the magnets and the internal objects of the bag.

Figure 9:
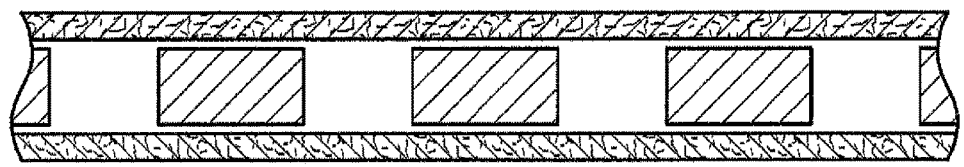
Figure 10:
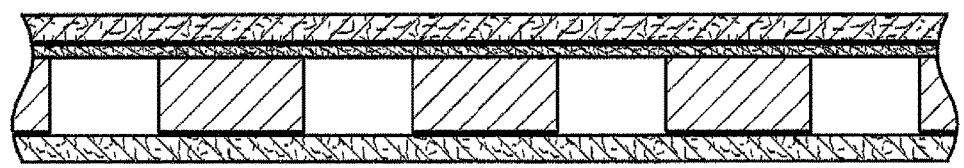
FIG. 10: A cross-section showing a lining between the outer and inner shell.
Figure 11:
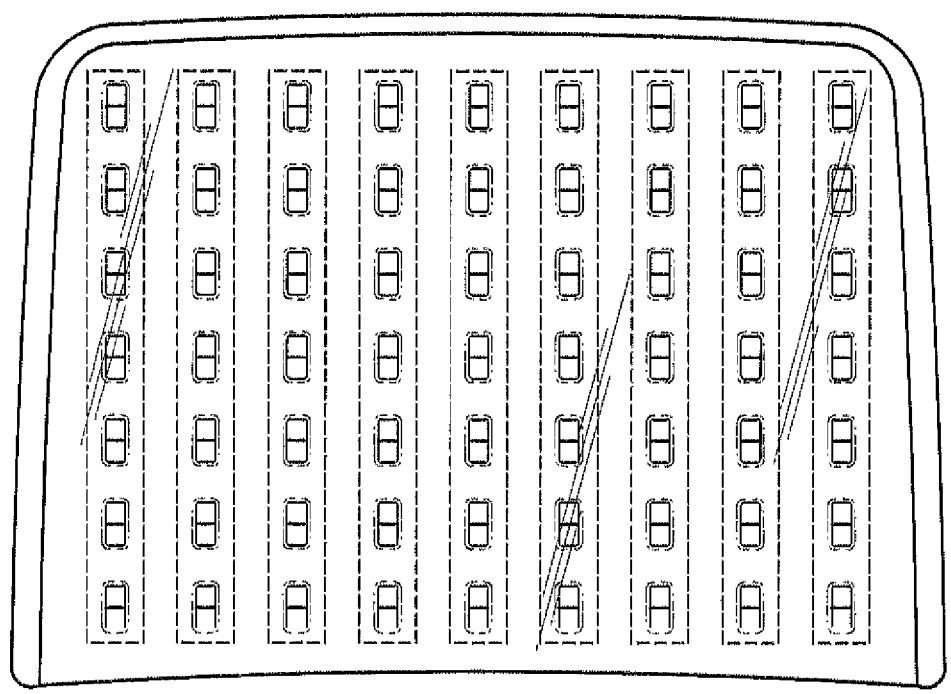
FIG. 11: An embodiment of the invention showing a top perspective of an open pouch handbag containing inserts of the invention. In this embodiment, the magnets are placed in slots cut into the foam.

FIG. 9 shows a cross-section of a bag showing an outer shell of the bag on the top of the figure and an inner shell on the bottom of the figure with a grid of magnets in between. FIG. 10 shows a cross-section of a bag showing an outer shell of the bag on the top of the figure and an inner shell on the bottom of the figure with a grid of magnets in between and a lining adjacent to the outer shell.

Figure 12:
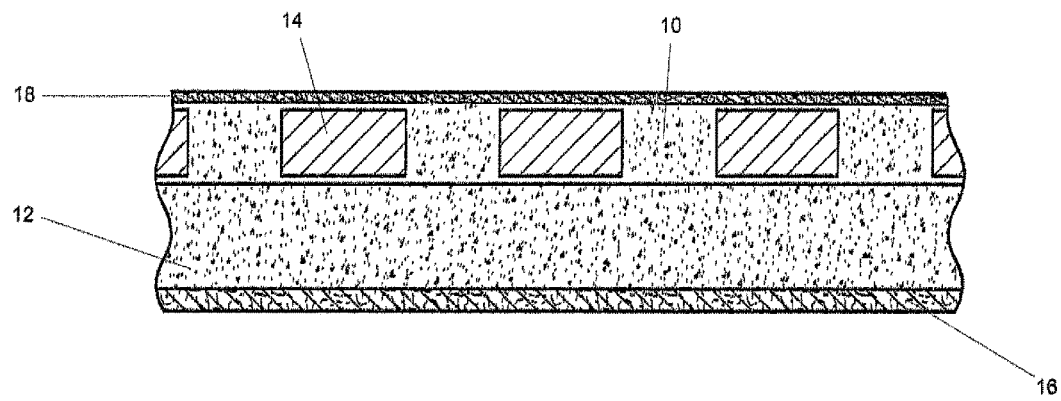
FIG. 12: A cross-section showing an outer shell with a grid of magnets embedded into foam and a second layer of foam.

FIG. 12 shows a cross-section showing an outer shell 16 having an outer foam layer 12 and an inner foam layer 10 with a grid of magnets 14 and a film or fabric liner 18 adjacent inner foam layer 10.

Figure 13:
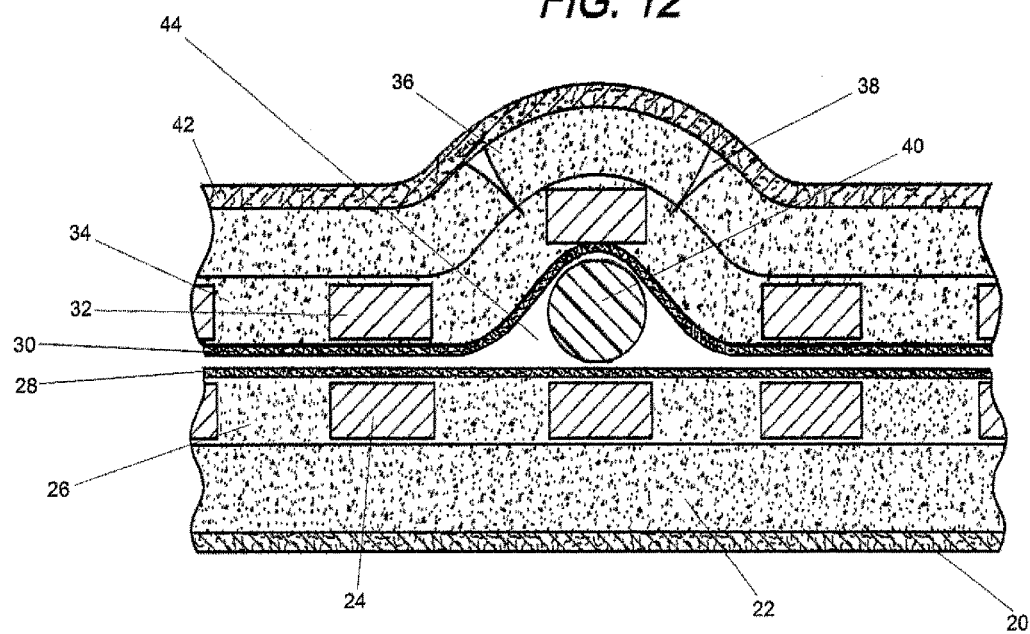
FIG. 13: A cross-section showing both sides of a bag, both sides having an inner foam layer with magnets and both sides having an outer foam layer, with one outer foam layer having slits, holding a non-metallic object.

FIG. 13 shows a cross-section showing both sides of a bag, one side having an outer shell 20 an inner foam layer 26 with magnets 24, an outer foam layer 22 and a film or fabric liner 28 adjacent inner foam liner 26. The other side has an outer shell 42, an inner foam layer 34, with magnets 32 and a film or fabric liner 30 adjacent inner foam liner 34. The other side also has an outer foam layer 36 with slits 38. A non-magnetizable object 40 is held between the two sides. The outer foam layer 36 with slits 38 gives additional flexibility to hold the non-magnetizable object 40 in the bag.

Figure 14:
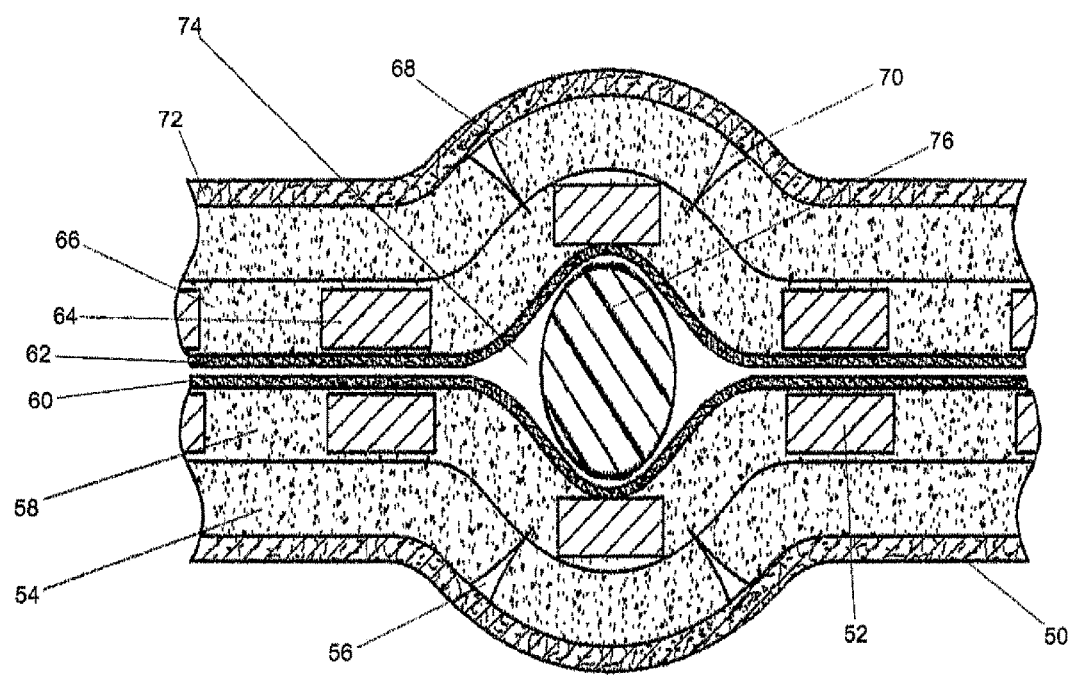
FIG. 14: A cross-section showing both sides of a bag, both sides having an inner foam layer with magnets and both sides having an outer foam layer with slits, holding a non-metallic object.

FIG. 14 shows a cross-section showing both sides of a bag, one side having an outer shell 50, an inner foam layer 58 with magnets 52, and a film or fabric liner 60 adjacent inner foam layer 58. There is an outer foam layer 54 with slits 56. The other side of the bag has an outer shell 72, an inner foam liner 66 with magnets 64 and a liner or fabric 62 adjacent inner foam layer 66. There is also an outer foam layer 68 with slits 70. The double layer of foam 54 and 68 with slits 56 and 70 gives additional flexibility to hold the non-magnetizable object 76 in the bag.

Figure 15:
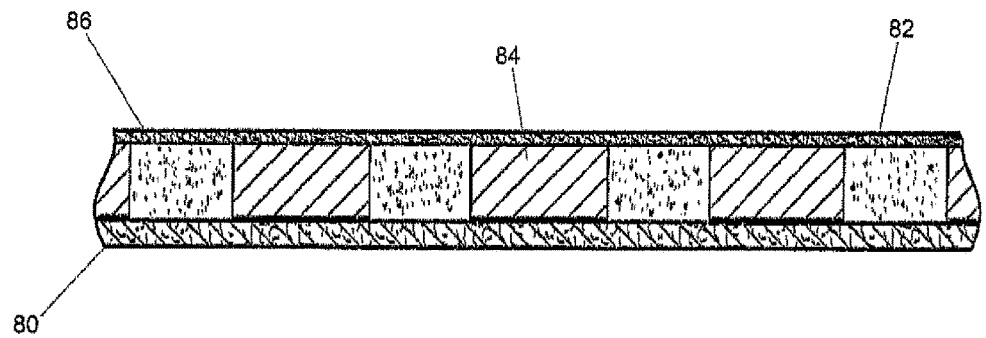
FIG. 15: A cross section showing a half bag.

FIG. 15 is a cross-section of a half bag showing an outer shell 80 with foam 82 attached, the foam 82 holding magnets 84 and with a film or fabric liner 86 on the opposite side from the outer shell 80.

Figure 16:
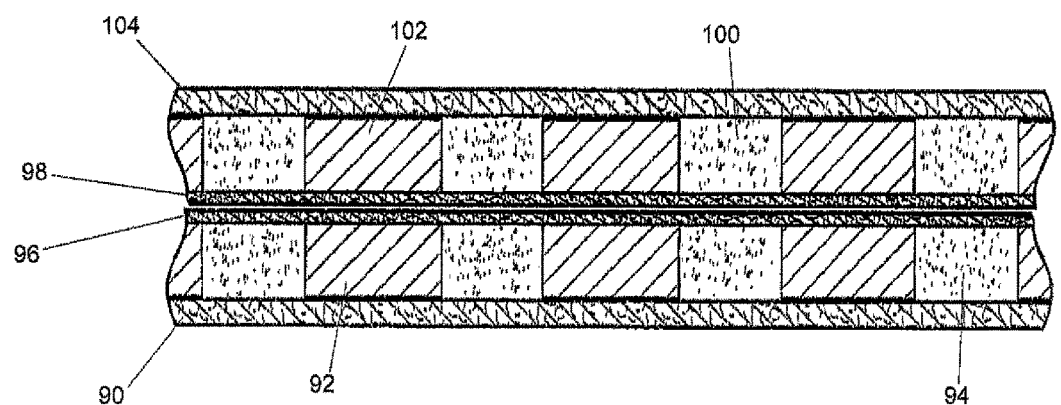
FIG. 16: A cross section showing a whole bag.

FIG. 16 is a cross-section of a whole bag with outer shells at opposite sides 90 and 104, each side with foam 94 and 100 each carrying magnets 92 and 102 and each side having a film or fabric liner 96 and 98 on the opposite side of each outer shell 90 and 104.

In certain embodiments, methods for gluing magnets to bag material may include;
Step 1: Choose dimensions specific to size of pocket or bag with corresponding magnet layout distance.
Step 2: Glue magnets to liner material.
Step 3: Cure glue.
Step 4: Install complete liner in pocket or bag internal wall.

In certain embodiments, methods for a sewing magnets to bag material may include;
Step 1: Choose dimensions specific to size of pocket or bag with corresponding magnet layout distance.
Step 2: Cut magnet slots into foam per desired magnet layout.
Step 3: Place magnets in foam and cover with clear PVC or desired fabric.
Step 4: Sew PVC or desired fabric to foam in order to hold all magnets in place.
Step 5: Optionally glue additional foam to back of foam containing magnets
Step 6: Optionally cut slits in back of foam in order to provide additional flexibility.

In certain embodiments, methods for a impregnating magnets to bag material may include;
Step 1: Insert magnets into foam cast or mold with desired layout and distance pre-formatted.
Step 2: Inject foam into mold.
Step 3: Cure foam then remove.
Step 4: Attach additional fabric or foam for strength and support if desired.

Figure 1:
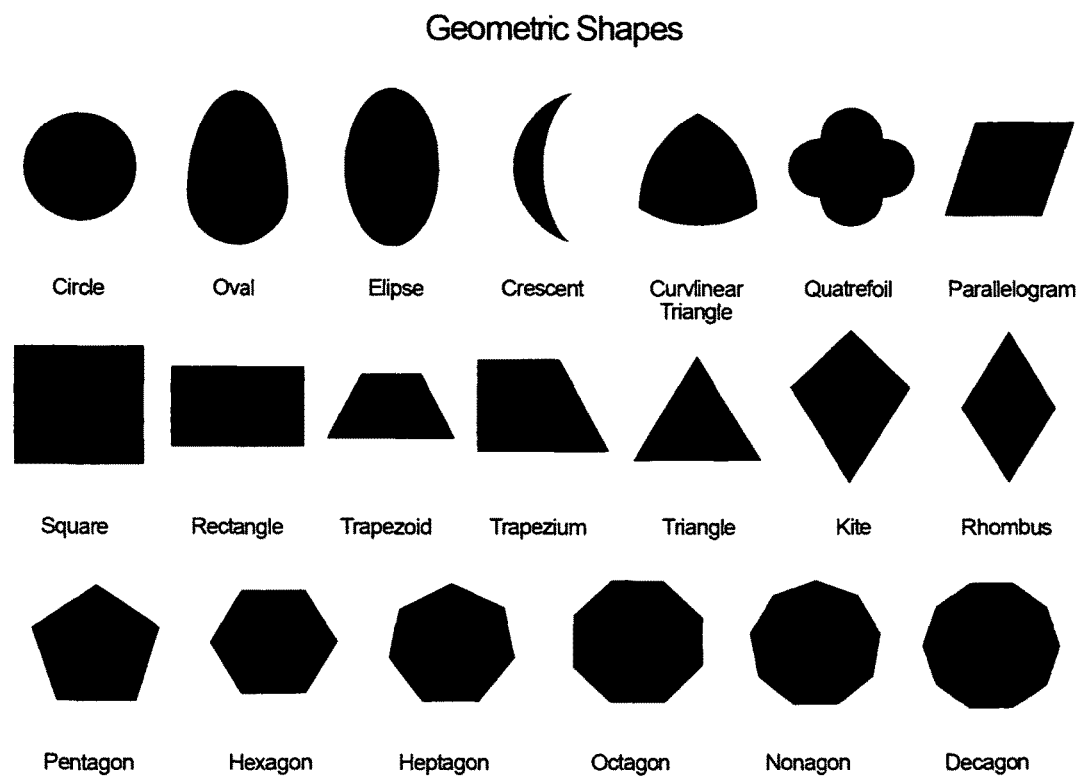
FIG. 1: Common geometric shapes of magnets which can be used in the present invention.

Magnets of all shapes and sizes are sown into the walls of the bag in a grid format with two identical symmetrical grids on either side of the bag. The magnets can vary in shape, size and strength to include diametric and axial cylinders, circles, rings, spheres, cubes, rods, discs, bars, blocks, xmod, motor and filings and film. FIG. 1 exemplifies certain magnetic shapes which are suitable for use in the invention. In certain embodiments, the magnet is shaped as a rectangular prism.

The magnet layout is a grid format on both the left and right side of the bag. The layout can be rows and columns, staggered (like a checker board) or circular with various spacing formats.

For jewelry applications, the bag magnet layout may be in rows and columns of 0.5 inch by 0.75 inch spacing with 3/16×3/8 cylindrical diametric magnets of N48 strength. In other jewelry application embodiments, the bag magnet layout may be in rows and columns of 0.5 inch by 0.75 inch spacing with 10×5×5 rectangular diametric magnets of N48 and N52 strength. For firearms applications, the magnet layout may be staggered, such as like on a checkerboard, having a separation of 1.75 inch by 2.5 inch spacing with 0.25 inch cube magnets of N48 and N52 strength. In other firearm application embodiments, the magnet layout may be staggered, such as like on a checkerboard, having a separation of 1.75 inch by 2.5 inch spacing with 12×6×6 mm rectangular magnets of N48 and N52 strength.

In certain embodiments, the cast or mold can contain an alternating bubble or raised bump type layout, such as patterned as a checkerboard layout. In such an embodiment, one mold on an inner lining of the carrying case of the mold will have the magnets placed in the bubble or raised bumps. On the opposite inner lining, the magnets may be placed on the depressed area in-between the bubble or raised bumps. When the two sides come in contact, the bubble or raised bumps attract via magnetism to rest in-between the raised bumps on the other side holding all objects in place.

What is claimed is:

1. A handbag for securing non-magnetizable objects comprising:
   an outer shell having an exterior surface and an interior surface on both sides of the handbag and being formed of a first material and having an open end and a closed end;
   wherein the interior surface forms a cavity;
   wherein the outer shell has a height defined between a top edge and a bottom surface; and
   wherein the outer shell has a width defined between a first edge and a second edge;
   an inner shell made of a second material and having an interior face adjacent to the interior surface of the outer shell and an exterior surface on both sides of the handbag creating a cavity in the handbag and wherein the inner shell has a maximum height defined by the top edge and the bottom surface and has a width defined between the first edge and the second edge;
   a layer of foam attached to each side of the exterior surface of the inner shell, the foam layers each having a maximum height defined by the top edge and the bottom surface and a width defined between the first edge and the second edge;
   a grid of magnets embedded into the foam on both sides of the exterior surface of the inner shell, wherein each grid of magnets has a height defined by the top edge and the bottom surface and a width defined by the first edge and the second edge, in which a film or fabric covers the magnet embedded foam, in which the two grids of magnets face each other, limiting the movement of objects in the handbag, due to the magnetic force of the grids of magnets facing each other, so that the two sides of the handbag are held together to form a firm hold on each non-magnetic object inside the handbag.

2. The handbag of claim 1 in which the grid of magnets is in a parallel pattern.

3. The handbag of claim 1 in which the film is clear polyvinyl chloride.

4. The handbag of claim 1 in which the film or fabric cover is sewn on the magnetic embedded foam to provide a soft layer between the magnets and the objects in the handbag.

5. The handbag of claim 1 in which the magnets are first inserted into a mold after which the foam is injected and cured.

6. The handbag of claim 1 in which slots are cut into the foam in a grid pattern and magnets are placed in the slots.

7. The handbag of claim 1 in which the magnets are identical symmetrical grids on either side of the bag so that the magnets on one side of the inner shell will exactly meet the magnets on the other side of the inner shell when the handbag is closed.

8. A handbag closed with one of, a zipper, clasp, strap, buttons, or magnets capable of securing non-magnetizable objects, comprising two sides, each side having an inside and an outside, creating a cavity, a layer of foam completely covering each inside of the handbag, a grid of magnets embedded into the foam on each inside, a grid of magnets filling each side of the foam and facing each other when the handbag is closed, so that when one or more objects are placed into the handbag and upon closing the handbag, the embedded magnets will form a firm hold on the object or objects in the handbag.

9. The handbag of claim 8 in which a film or fabric covers the grids of magnets to provide a soft layer between the magnets and the objects in the handbag.

10. The handbag of claim 8 in which the two grids of magnets are identical symmetrical grids.

\* \* \* \* \*